(12) United States Patent
Netzer et al.

(10) Patent No.: US 9,303,994 B2
(45) Date of Patent: Apr. 5, 2016

(54) PLANAR CORIOLIS GYROSCOPE

(75) Inventors: Yishay Netzer, Yuvalim (IL); Michael Girgel, Kiryat Motzkin (IL)

(73) Assignee: YSENSORS LTD., Misgav Industrial Park (IL)

( * ) Notice: Subject to any disclaimer, the term of this patent is extended or adjusted under 35 U.S.C. 154(b) by 326 days.

(21) Appl. No.: 14/002,741

(22) PCT Filed: Mar. 8, 2012

(86) PCT No.: PCT/IB2012/051079
§ 371 (c)(1),
(2), (4) Date: Sep. 3, 2013

(87) PCT Pub. No.: WO2012/120464
PCT Pub. Date: Sep. 13, 2012

(65) Prior Publication Data
US 2013/0333470 A1    Dec. 19, 2013

Related U.S. Application Data

(60) Provisional application No. 61/464,665, filed on Mar. 8, 2011.

(51) Int. Cl.
*G01C 19/56* (2012.01)
*G01C 19/574* (2012.01)
*G01C 19/5747* (2012.01)

(52) U.S. Cl.
CPC ............. *G01C 19/56* (2013.01); *G01C 19/574* (2013.01); *G01C 19/5747* (2013.01)

(58) Field of Classification Search
CPC ................... G01C 19/5712; G01C 19/574
USPC ........................................................ 73/504.12
See application file for complete search history.

(56) References Cited

U.S. PATENT DOCUMENTS

| | | | | |
|---|---|---|---|---|
| 5,359,893 A | * | 11/1994 | Dunn | G01C 19/5719 73/504.12 |
| 6,386,033 B1 | * | 5/2002 | Negoro | G01C 19/5719 73/504.12 |
| 6,805,007 B2 | | 10/2004 | Fell et al. | |
| 6,823,733 B2 | * | 11/2004 | Ichinose | G01C 19/5719 73/504.02 |
| 6,928,873 B2 | | 8/2005 | Chen et al. | |
| 7,004,024 B1 | | 2/2006 | Park | |
| 2009/0056443 A1 | | 3/2009 | Netzer | |
| 2010/0132460 A1 | | 6/2010 | Seeger et al. | |

* cited by examiner

*Primary Examiner* — John Chapman, Jr.
(74) *Attorney, Agent, or Firm* — Mark M. Friedman

(57) ABSTRACT

A planar Coriolis gyroscope includes at least two counter oscillating masses attached to a common rigid frame by one or more elastic members defining an excitation axis. The frame is attached to a support region by one or more additional elastic members which together with the masses define a Coriolis resonator. The Coriolis resonator responds to inertial rotation of the gyroscope and in conjunction with a position pickoff provides a signal indicative on the gyroscope inertial rotation.

8 Claims, 4 Drawing Sheets

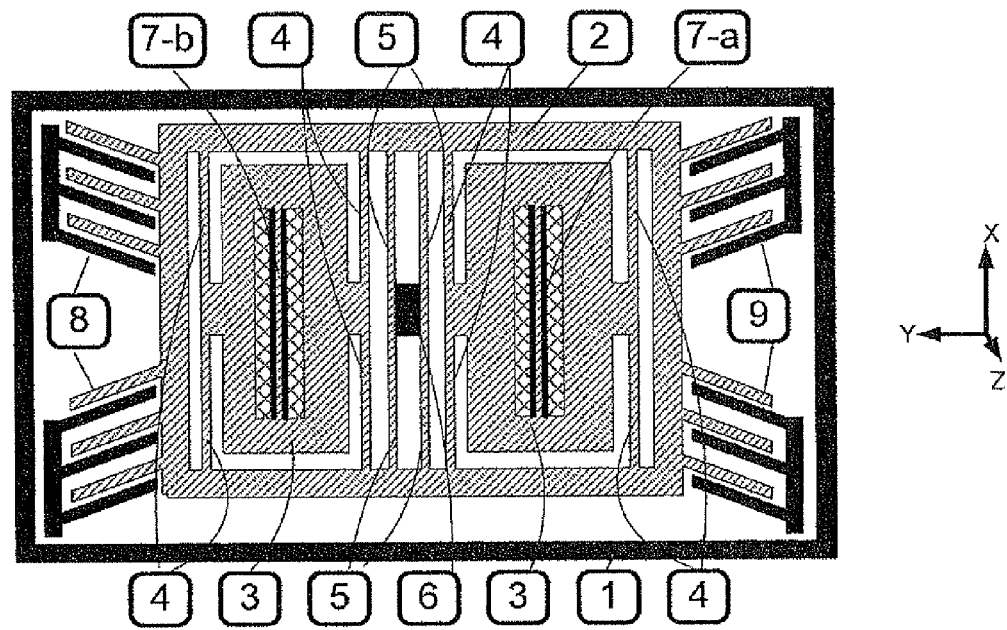
Figure 1-a
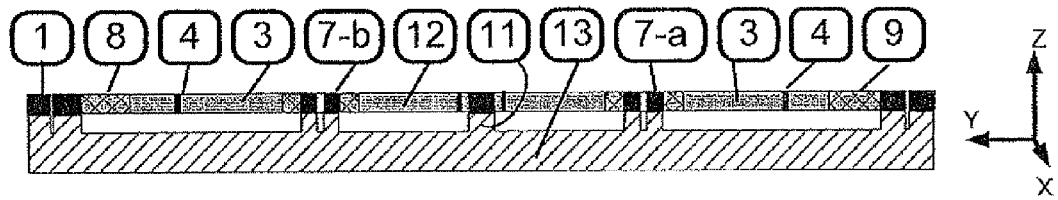
Figure 1-b

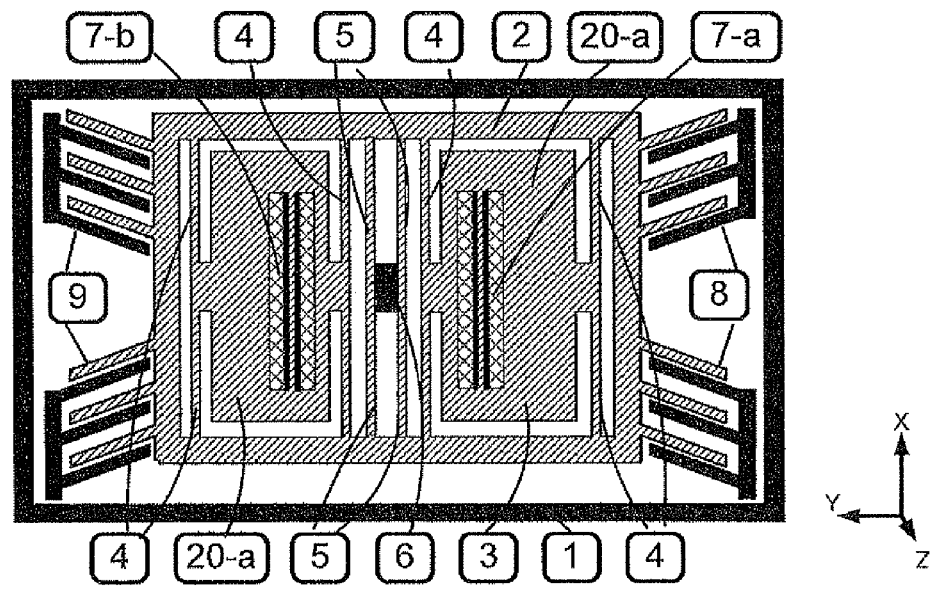
Figure 7-a
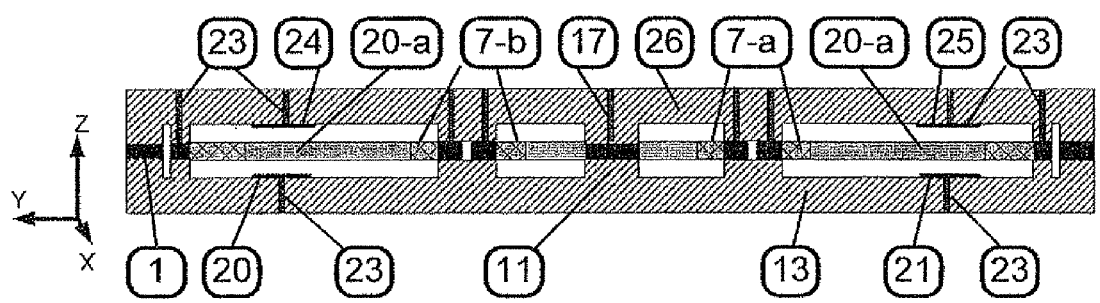
Figure 7-b

PLANAR CORIOLIS GYROSCOPE

FIELD AND BACKGROUND OF THE INVENTION

The present invention relates to MEMS planar gyroscopes for sensing a rate of inertial rotation around at least one axis.

MEMS planar gyroscopes based on two counter oscillating masses are described, for example, in U.S. Pat. No. 7,243,542. They are often referred to as Tuning-Fork-Gyroscopes (TFG). A TFG has two main vibration modes: an Excitation mode in which the two masses are counter oscillating in the device plane and constitute an in-plane primary resonator, and a Coriolis mode in which the two masses constitute a secondary resonator which responds to Coriolis forces. The secondary resonator can be either in-plane or out-of-plane. Coriolis forces result from interaction of the measured inertial rotation rate and the gyroscope primary resonator periodic velocity. The secondary mode—also referred to as the Coriolis mode—can be perpendicular to the device (gyroscope) plane, or out of this plane. The Coriolis forces which are indicative of the inertial rotation rate can be measured by two methods well known to those in the art: open loop operation based on sensing the amplitude and phase of the secondary resonator using a position pickoff, and closed-loop (force-balance) operation based on deriving from the position pickoff control signals that are used to generate forces which act on the secondary resonator and oppose the Coriolis forces. The present invention can be implemented using either method.

The motion of the two masses that constitute the Coriolis resonator in response to inertial rate are ideally equal and opposite, while their responses to external linear vibrations are the same. If this condition is met then the difference between their motions in response to external vibrations is zero (common mode) while the Coriolis induced motions (differential mode) are added.

In prior art TFG, each of the two masses in combination with their supporting springs constitutes an individual mechanical Coriolis sub resonator with some mutual mechanical coupling. As a result the resonant frequency of each sub resonator is principally determined by its respective mass and springs and to some extent by the other resonator. If, due to mechanical manufacturing tolerances, the resonant frequencies of the two masses are not perfectly matched, they will respond differently to linear vibration and the difference between their responses will result in an erroneous reading under vibration conditions—see for example U.S. Pat. No. 7,043,985.

Another disadvantage of prior art TFGs is that the vibrating structure is supported by more than a single anchor region, or point; typically 2 or 4 regions. For example, the TFG described in U.S. Pat. Nos. 7,043,985 and 5,349,855 are symmetrical in both X and Y axes but the vibrating structure is supported by 2 widely separated anchor regions. In both patents, the Coriolis sub resonators are only lightly coupled. Similarly, the TFG described in U.S. Pat. Nos. 7,243,542 and 6,571,630 are supported by 4 anchor regions.

The disadvantage of supporting the vibrating structure by more than a single anchor is that stress is induced in the TFG device layer in response to temperature, as a result of differential thermal expansion between the substrate layer (e.g. glass) and the Silicon vibrating structure attached to it. This stress is proportional to the difference in expansion coefficient and to the separation between the anchor points. Ideally this distance is zero, i.e., all anchor points converge to a single point.

A further disadvantage of prior art TFG is that the springs that support the vibrating masses serve both primary and secondary resonators and cannot be optimized separately—see below.

SUMMARY OF THE INVENTION

A planar MEMS gyroscope includes two counter-oscillating masses supported by flexible beams that extend from a common frame. According to certain preferred embodiments, the frame is supported by a single anchor region relative to a substrate by means of additional beams that extend from it and which provide rotational resiliency (Coriolis mode). The masses, frame and beams are all fabricated from a common substrate (device layer). The gyroscope is typically relatively insensitive to differential thermal expansion between the device layer and substrate and, in some cases, achieves a near 100% coupling between the two masses in the Coriolis mode.

According to the teachings of the present invention there is provided, an inertial rotation rate sensor comprising: (a) a lower substrate; (b) a device layer substantially parallel to the lower substrate, the device layer comprising: (i) a substantially rigid frame supported by a first plurality of compliant members that extend from a support region attached to the lower substrate, and (ii) at least two masses each supported by a second plurality of compliant members which extend from the frame, such that the at least two masses in conjunction with the second plurality of compliant members make up a first resonator having at least a first mode of motion relative to the frame in which the at least two masses undergo counter-oscillation, and such that the at least two masses and the frame in conjunction with the first plurality of compliant members make up a second resonator having at least a first mode in which the frame and the at least two masses oscillate together relative to the lower substrate; (c) an actuator deployed for exciting oscillatory motion of one of the first and second resonators, referred to as the excitation resonator; and (d) a position pickoff deployed for sensing a current position of the other of the first and second resonators, referred to as the Coriolis resonator, such that, when the excitation resonator is driven via the actuator in an oscillatory motion, the oscillatory motion combines with an inertial rotation rate around at least a first rotation axis to generate a Coriolis force acting on the at least two masses to excite the first mode of the Coriolis resonator, thereby allowing derivation of the inertial rotation rate about the first rotation axis.

According to a further feature of an embodiment of the present invention, the first resonator is the excitation resonator and the second resonator is the Coriolis resonator.

According to a further feature of an embodiment of the present invention, the first mode of the Coriolis resonator is an in-plane rotational mode.

According to a further feature of an embodiment of the present invention, a second position pickoff is deployed for sensing a position of the Coriolis resonator in a second out-of-plane rotational mode, thereby allowing sensing of a second inertial rotation rate about a second rotation axis.

According to a further feature of an embodiment of the present invention, the first mode of the Coriolis resonator is an out-of-plane rotational mode.

According to an alternative feature of an embodiment of the present invention, the second resonator is the excitation resonator and the first resonator is the Coriolis resonator.

According to a further feature of an embodiment of the present invention, a processing system including at least one processor is provided, the processing system being associated with the actuator and the position pickoff, and being configured to: (i) actuate the actuator so as to generate oscillatory motion of the excitation resonator, and (ii) process a signal from the position pickoff indicative of a motion of the Coriolis oscillator, thereby determining the inertial rotation rate about the first rotation axis.

According to a further feature of an embodiment of the present invention, the position pickoff is part of a force balance arrangement deployed for opposing motion of the Coriolis oscillator, the sensor further comprising a processing system including at least one processor, the processing system being associated with the actuator and the force balance arrangement, and being configured to: (i) actuate the actuator so as to generate oscillatory motion of the excitation resonator, and (ii) process a signal from the force balance arrangement indicative of a magnitude of the Coriolis force on the at least two masses, thereby determining the inertial rotation rate about the first rotation axis.

BRIEF DESCRIPTION OF THE DRAWINGS

The invention is herein described, by way of example only, with reference to the accompanying drawings, wherein:

FIG. 1-a shows a top view of a preferred embodiment of the invention.

FIG. 1-b shows a cross sectional view of a preferred embodiment of the invention.

FIG. 2-b shows a variable overlap comb drive.

FIG. 7-a shows the device layer of a dual axis embodiment of the invention.

FIG. 7-b shows a cross sectional view of a dual axis embodiment of the invention.

DESCRIPTION OF THE PREFERRED EMBODIMENTS

The TFG of the certain preferred embodiments of the present invention is based on novel geometry which preferably exhibits some or all of the following advantages:

1. Symmetrical in both X and Y axes and in some embodiments also in the Z axis.

2. The complete TFG structure is supported by a single point or region, thus minimizing thermally induced stresses.

3. The mechanical coupling of the two Coriolis sub resonators is substantially 100% i.e. their individual motions combine into a single oscillation mode.

4. The excitation mode and Coriolis vibration modes use separate sets of springs, which can be optimized separately to satisfy the constraints of Silicon machining by a DRIE (Deep Reactive Ion Etching) fabrication process. (It is well known to those skilled in the art that the width of trenches and features in the Silicon device layer cannot be arbitrarily chosen and must satisfy design rules dictated by the DRIE machine.)

5. In certain preferred embodiments of the invention, the TFG has a top substrate, which enables the TFG to have 3 orthogonal planes of symmetry. The top substrate can serve as a mechanical stop to provide immunity against shocks in the Z axis; it also enables the implementation of a vacuum sealed enclosure using a wafer level sealing process, as is known to those skilled in the art.

Figure 2:
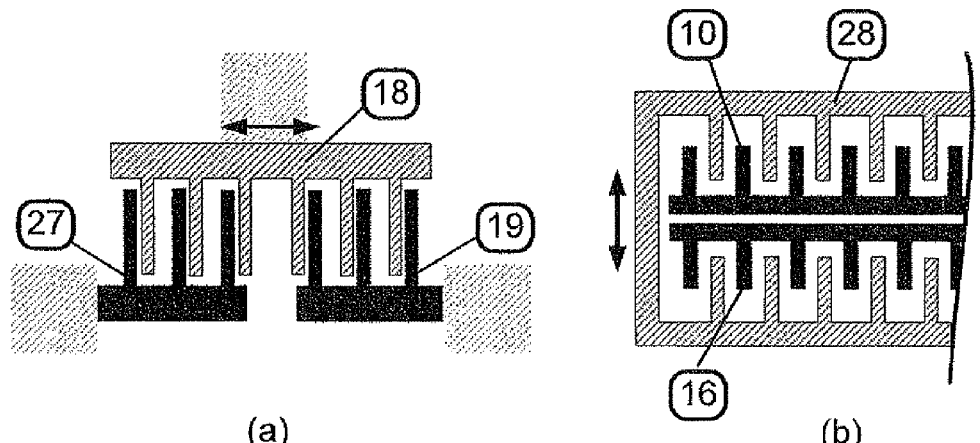
FIG. 2-a shows a variable gap comb drive.
Figure 3:
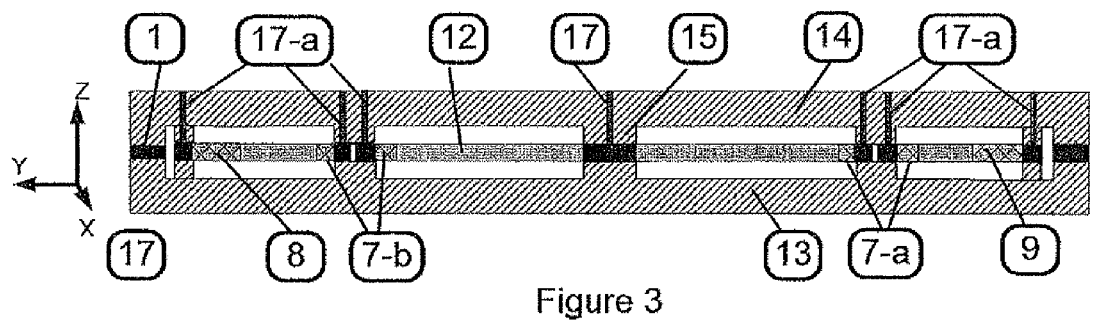
FIG. 3 shows a cross sectional view of a preferred embodiment of the invention with a bottom and top substrates.

Turning now to the drawings, FIG. 1-a illustrates the device layer geometry of a preferred embodiment of the invention. Fixed frame 1 surrounds the active structure of the gyro and may be used as a part of a sealed enclosure for maintaining vacuum as shown in FIG. 3. The active structure (device layer) of the gyro features a movable frame 2, and two counter oscillating masses 3 that, together with springs 4 that couple them to frame 2, constitute the primary resonator. Springs 5 extend from frame 2 to a fixed anchor (support) region 6. A first comb drives pair 7-a—shown schematically by cross-hatched rectangles, applies bidirectional forces in the Y direction on one of masses 3 and a second comb drive 7-b serves as a position pickoff. Combs 7-a and 7-b are not detailed but are of the variable overlap area type—shown schematically in FIG. 2-b. The black areas in all illustrations are the fixed parts of the device layer. In order to generate bidirectional force comb drives 10 and 16 are paired and are anchored to the substrate layer, they operate in conjunction with facing combs 28 which are integral with the moving mass. A servo loop incorporates the comb drives, the position pickoff, and control circuitry (not shown) to sustain the excitation mode oscillations. Springs 5 enable in-plane rotation of frame 2 and masses 3 around anchor region 6, thereby constituting the Coriolis (secondary) resonator—or mode. In a typical embodiment, the Coriolis motion is sensed by means combs 8 and 9. Combs 8, and 9 are of the variable gap type shown schematically in FIG. 2-a where complementary combs 19 and 27 are stationary and comb 18 is integral with the moving frame 2. The range of motion is less than the smaller inter-digit spacing between the combs.

When the gyroscope is operated in the closed-loop mode, combs 9 (interchangeable with combs 8) can be used for generating the balancing force. In the latter case, and in order to maintain symmetry, the sensing and drive functions are preferably implemented symmetrically by splitting combs 8 and 9 into sections (not shown) such that different sections of each serve the sensing and force-balancing roles.

According to certain preferred embodiments, the gyroscope of the present invention operates as follows: In the presence of inertial rate around Z-axis (perpendicular to the X-Y plane) a Coriolis torque is generated which acts on the Coriolis resonator; this torque is proportional to the instantaneous oscillation speed of the masses 3 and to the measured inertial rate. This torque results in an oscillatory motion of the Coriolis resonator which includes the entire frame 2 and masses 3 around anchor region 6. This oscillation is measured and converted into an AC signal by means of combs 8 and/or 9 and their support electronics. This AC signal is conventionally synchronously demodulated using a reference signal which is derived from the position pickoff of the primary resonator, and is low-pass filtered to provide a signal proportional to the inertial rotation rate of the gyroscope. The gyroscope can also be operated in a closed-loop mode in which the Coriolis torque is counteracted by corresponding and opposite torque generated by Coriolis combs 9 (or segments of combs 8 and 9). Since the two masses 3 are attached to frame 2 which is rigid, and the springs 4 are designed to inhibit motion of masses 3 in the X-direction relative to frame 2, their Coriolis motions are equal and opposite. As a result, the structure tends to be insensitive to induced errors, since the mechanical coupling between the two Coriolis sub resonators is substantially 100%.

FIG. 1-b is a schematic cross section of the gyroscope in FIG. 1-a in which support region 6 is implemented by means of a pedestal 11 which extends from stationary bottom layer (substrate) 13 and provides the sole support for vibrating structure 12 which includes said masses, springs, frame, and combs.

FIG. 3 is a schematic cross sectional illustration of the gyroscope in FIG. 1-a with an added top substrate 14, top pedestal 15, and via 17 which provides electrical connection to the device layer 12 and its different combs all held at a common electrical potential. As is well known to those skilled in the art such potential is needed for generating force in the actuating combs and for generating signal in the sensing combs. Vias 17-a provide electrical connections to the fixed portions of the different combs. Preferably, the symmetry of the gyroscope relative to the device layer provides one or more of the following advantages:

1. The resonator structure (device layer) is supported on both sides and is held more firmly.

2. Any stray out-of-plane electrostatic field lines emanating from by the combs are symmetrical relative to the device layer, thereby eliminating parasitic out-of-plane forces that would otherwise act on the vibrating structure and deflect it out-of-plane.

3. The top substrate provides a closed structure that can be evacuated to provide a vacuum enclosure to eliminate the need for a separate vacuum package. It is known to those skilled in the art that a vacuum enclosure is important for reducing damping and increasing the quality factor Q of the excitation and Coriolis resonators. High Q in the excitation resonator reduces the power consumption—while high Q in the Coriolis resonator reduces the Thermo-mechanical noise.

4. The top substrate provides a mechanical stop that helps to protect the moving structure from shock induced breakage.

Figure 4:
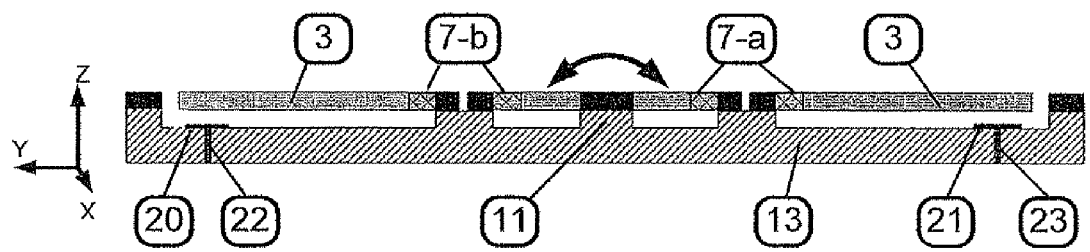
FIG. 4 shows a cross sectional view of an out-of-plane embodiment of the invention.

FIG. 4 illustrates a cross section of still another embodiment of the invention. In this embodiment the primary resonator is as before but the gyroscope responds to inertial rotation around the X axis. Coriolis torque will be generated around the X axis in response to inertial rotation rate around X-axis and will oscillate the masses 3 out of the X-Y plane by twisting the springs 5 in FIG. 1. This motion is then sensed by an out-of-plane position pickoff that includes capacitive plates 20 and 21 (instead of in-plane combs 8 and 9) that interact with the opposing surfaces of the device layer, and the resulting signal is demodulated and converted into a proportional output, as before. The electrical connection to plates 20 and 21 is made by means of vias 22 and 23. Capacitive plates 20, 21 can be split into signal generating and force generating portions to be used in the force-balance mode of operation.

Figure 5:
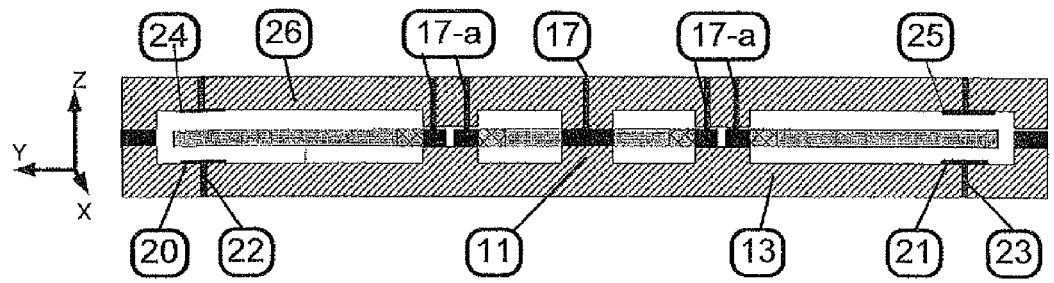
FIG. 5 shows a cross sectional view of an out-of-plane embodiment of the invention with a bottom and top substrates.

FIG. 5 illustrates a three layer sealed version of the embodiment of FIG. 4 wherein top substrate 26 and additional sensing plates 24 and 25 provide the sealed enclosure and up-down symmetry, with one or more consequent advantages as described above.

Figure 6:
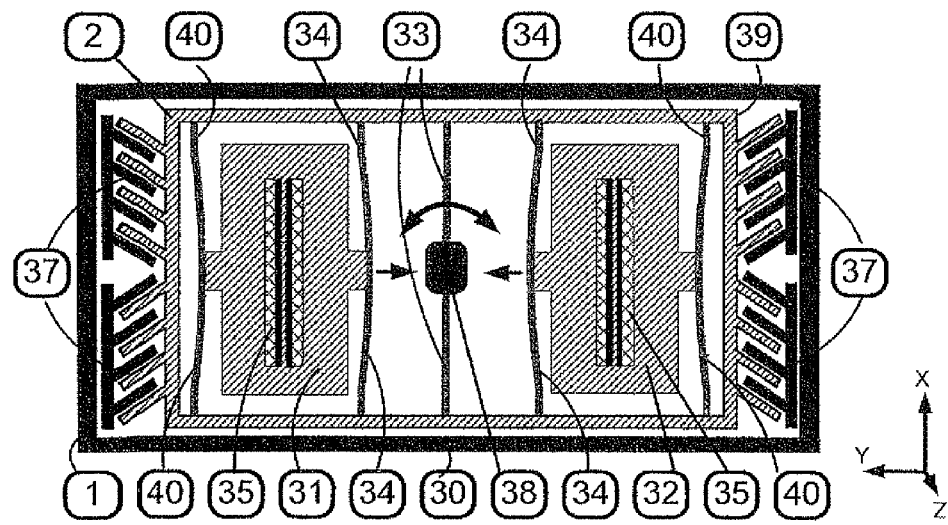
FIG. 6 shows an embodiment with interchanged roles of the primary and secondary resonators.

FIG. 6 illustrates schematically a still further implementation of the invention in which the roles of the excitation and Coriolis motions are interchanged relative to FIG. 1; excitation motion of the two masses 31 and 32 is an in-plane rotary motion as a unit with frame 39 around region. 38, i.e., about the Z-axis while the Coriolis oscillatory motion is induced equally and oppositely for the two masses along the Y-axis (i.e., radially relative to the axis of excitation motion). Frame 39 supports the two masses 31 and 32 by means of springs 34 and 40 which allow Coriolis resonator oscillatory motion along the Y axis. Springs 33 extend from frame 39 towards anchor region 38 to allow the excitation rotary motion. Comb assemblies 37 generate torques which results in rotary excitation motion and preferably also serve to measure this motion. The combs are parts of a servo loop intended to control the excitation motion. Combs 35 may be either of the variable gap or variable overlap type and measure the Coriolis motion. They can be also used for generating opposing forces when the gyroscope is operated in a close loop mode (force balance). Stationary frame 30 can be used in conjunction with a top layer (not shown) to provide up/down symmetry and a sealed enclosure, with one or more consequent advantages as described before.

FIGS. 7-a & 7-b illustrate schematic device layer and cross-sectional views of a three layer embodiment, respectively, of a further implementation of the invention which simultaneously senses inertial rotation about two axes by combining the operation of the single axis gyro of FIG. 1 and that of the gyroscope in FIG. 4. This dual-axis embodiment measures independently inertial rates about the Z and the X axes. In this embodiment of the invention, the two masses counter oscillate as in FIG. 1 but the excitation combs 7-a and 7-b are located closer to the center so that portions 20-a of the masses in conjunction with facing plates 20, 24, 21, 25 on the substrates in conjunction with vias 23 constitute capacitances that vary in response to vibration of the masses perpendicular to the device plane. Such vibrations are generated when the gyroscope rotates in inertial space around the X axis. This rotation induces Coriolis forces perpendicular to the device plane which excites the angular vibration mode around the X-axis. The resonant frequency of this mode depends on the inertia of the vibrating masses around the X axis and the torsional stiffness of springs 5. By measuring the amplitude of these vibrations a signal proportional to the inertial rate around the X-axis is obtained. The inertial rotation rate around the Z-axis is obtained in the same manner as in the single axis gyroscope in FIG. 1 using combs 8 and 9. In order to increase the measurement sensitivity in both the Z-axis and the X-axis, the resonant frequencies of the two corresponding Coriolis modes preferably coincide with the excitation vibration frequency. In order to satisfy this requirement, the spring compliance must be controlled both in bending and in torsion which cannot be met with an arbitrary thickness of springs 5 (which is determined by the device layer thickness). According to certain preferred implementations of the present invention, this is achieved by optimizing both the spring width, length and device layer thickness.

It will be appreciated that the above descriptions are intended only to serve as examples, and that many other embodiments are possible within the scope of the present invention as defined in the appended claims.

What is claimed is:

1. An inertial rotation rate sensor comprising:
    (a) a lower substrate;
    (b) a device layer substantially parallel to said lower substrate, said device layer comprising:
        (i) a substantially rigid frame supported by a first plurality of compliant members that extend from a support region attached to said lower substrate, and
        (ii) at least two masses each supported by a second plurality of compliant members which extend from said frame,
        such that said at least two masses in conjunction with said second plurality of compliant members make up a first resonator having at least a first mode of motion relative to said frame in which said at least two masses undergo counter-oscillation,
        and such that said at least two masses and said frame in conjunction with said first plurality of compliant members make up a second resonator having at least a first mode in which said frame and said at least two masses oscillate together relative to said lower substrate;

(c) an actuator deployed for exciting oscillatory motion of said first resonator, referred to as the excitation resonator; and (d) a position pickoff deployed for sensing a current position of said second resonator, referred to as the Coriolis resonator, such that, when said excitation resonator is driven via said actuator in an oscillatory motion, said oscillatory motion combines with an inertial rotation rate around a rotation axis to generate a Coriolis force acting on said at least two masses to excite the first mode of said Coriolis resonator, thereby allowing derivation of the inertial rotation rate about the rotation axis, wherein said first plurality of compliant members comprises two spaced-apart parallel beams integrated at a central region of said parallel beams with said support region and integrated at extremities of said parallel beams with said frame.

2. The sensor of claim 1, wherein said first mode of said Coriolis resonator is an in-plane rotational mode.

3. The sensor of claim 2, wherein said position pickoff of said Coriolis resonator comprises at least one interdigitated comb arrangement comprising a first comb supported by said frame and a second comb supported from said substrate, wherein said comb arrangement includes comb elements aligned substantially radially with respect to said support region.

4. The sensor of claim 1, further comprising a processing system including at least one processor, said processing system being associated with said actuator and said position pickoff and being configured to:
 (i) actuate said actuator so as to generate oscillatory motion of said excitation resonator, and
 (ii) process a signal from said position pickoff indicative of a motion of said Coriolis oscillator, thereby determining the inertial rotation rate about the rotation axis.

5. The sensor of claim 1, wherein said position pickoff is part of a force balance arrangement deployed for opposing motion of said Coriolis oscillator, the sensor further comprising a processing system including at least one processor, said processing system being associated with said actuator and said force balance arrangement, and being configured to:
 (i) actuate said actuator so as to generate oscillatory motion of said excitation resonator, and
 (ii) process a signal from said force balance arrangement indicative of said Coriolis force on said at least two masses, thereby determining the inertial rotation rate about the rotation axis.

6. The sensor of claim 1, wherein positions and dimensions of said first plurality of compliant members are such that a resonant frequency of said second resonator substantially matches a resonant frequency of said first resonator.

7. The sensor of claim 1, further comprising a top substrate overlying said device layer, wherein said top substrate is attached to said support region of said device layer such that said device layer is symmetrically supported between said substrate and said top substrate.

8. The sensor of claim 7, wherein said substrate and said top substrate together form part of an at least partially evacuated sealed enclosure.

* * * * *